United States Patent
Gstach et al.

(10) Patent No.: US 9,970,465 B2
(45) Date of Patent: May 15, 2018

(54) EXPANSION ANCHOR WITH AN ANISOTROPIC COEFFICIENT OF FRICTION

(71) Applicant: Hilti Aktiengesellschaft, Schaan (LI)

(72) Inventors: Peter Gstach, Schaan (LI); Bernhard Winkler, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 73 days.

(21) Appl. No.: 15/037,452

(22) PCT Filed: Nov. 18, 2014

(86) PCT No.: PCT/EP2014/074883
§ 371 (c)(1),
(2) Date: May 18, 2016

(87) PCT Pub. No.: WO2015/075022
PCT Pub. Date: May 28, 2015

(65) Prior Publication Data
US 2016/0290374 A1    Oct. 6, 2016

(30) Foreign Application Priority Data
Nov. 25, 2013    (EP) ..................................... 13194195

(51) Int. Cl.
F16B 13/06    (2006.01)
F16B 2/00    (2006.01)

(52) U.S. Cl.
CPC ............ *F16B 2/005* (2013.01); *F16B 13/065* (2013.01); *F16B 13/066* (2013.01)

(58) Field of Classification Search
CPC ....... F16B 2/005; F16B 13/065; F16B 13/066

USPC .......................................................... 411/71
See application file for complete search history.

(56) References Cited

U.S. PATENT DOCUMENTS

| | | | | |
|---|---|---|---|---|
| 1,234,487 | A | * | 7/1917 | Raeger .................. F16B 13/124 279/104 |
| 3,461,772 | A | * | 8/1969 | Barry .................... F16B 13/126 411/80.1 |
| 3,832,931 | A | * | 9/1974 | Talan .................... F16B 13/126 411/56 |

(Continued)

FOREIGN PATENT DOCUMENTS

| | | |
|---|---|---|
| AU | 650744 B2 | 6/1994 |
| CN | 102859208 | 1/2013 |

(Continued)

OTHER PUBLICATIONS

Scientific Reports—Friction Anisotropy with Respect to Topographic Orientation, published Dec. 17, 2012, authors—Chengjiao Yu and Q. Jane Wong.*

*Primary Examiner* — Gary W Estremsky
(74) *Attorney, Agent, or Firm* — Davidson, Davidson & Kappel, LLC

(57) ABSTRACT

An expansion anchor including a stud, at least one expansion element, and at least one slanted surface that is arranged on the stud and that pushes the expansion element radially outwards when the stud is moved in a pull-out direction relative to the expansion element is provided. It is provided that the coefficient of friction between the expansion element and the slanted surface is dependent on the direction.

5 Claims, 1 Drawing Sheet

(56) References Cited

U.S. PATENT DOCUMENTS

| | | | | |
|---|---|---|---|---|
| 3,921,496 A | * | 11/1975 | Helderman | F16B 13/126 |
| | | | | 411/17 |
| 4,474,515 A | * | 10/1984 | Pitzer | F16B 13/066 |
| | | | | 411/16 |
| 4,940,372 A | * | 7/1990 | Fischer | F16B 13/063 |
| | | | | 411/32 |
| 4,968,200 A | | 11/1990 | Mark | |
| 5,076,733 A | * | 12/1991 | Frease | F16B 13/066 |
| | | | | 405/259.1 |
| 5,176,481 A | | 1/1993 | Schiefer | |
| 2008/0050195 A1 | | 2/2008 | Wieser et al. | |
| 2010/0010787 A1 | * | 1/2010 | Suematsu | A61B 17/12022 |
| | | | | 703/2 |
| 2013/0040743 A1 | * | 2/2013 | Kind | B21H 1/18 |
| | | | | 470/2 |

FOREIGN PATENT DOCUMENTS

| | | |
|---|---|---|
| EP | 0514342 A1 | 11/1992 |
| EP | 0567203 A2 | 10/1993 |

* cited by examiner

EXPANSION ANCHOR WITH AN
ANISOTROPIC COEFFICIENT OF FRICTION

The invention relates to an expansion. Such an expansion anchor is fitted with a stud, with at least one expansion element and with at least one slanted surface that is arranged on the stud and that pushes the expansion element radially outwards when the stud is moved in a pull-out direction, especially axially, relative to the expansion element.

BACKGROUND

Expansion anchors are disclosed, for example, in European patent application EP 0514342 A1. They are inserted into a hole drilled in a substrate, for instance, a wall or ceiling of a structure. When an expansion cone that is arranged on the stud and that has a slanted surface is pulled into an expansion element configured as an expansion sleeve, this expansion element is widened radially and pushed outwards, thereby anchoring the expansion anchor in the substrate. According to EP 0514342 A1, a friction-reducing coating is provided on the contact surface between the stud and the expansion element.

U.S. Pat. Appln. No. 2008/050195 A describes an expansion anchor in which the surface roughness of the expansion sleeve increases towards the rear end of the anchor.

European patent application EP 0567203 A2 discloses a rolling method in which an anisotropic coefficient of friction is generated by texturing the roller surface.

SUMMARY OF THE INVENTION

It is an objective of the invention to provide an expansion anchor that has a very high performance, that is versatile in use while also being very reliable and easy to produce.

An expansion anchor according to the invention is characterized in that the coefficient of friction between the expansion element and the slanted surface is dependent on the direction.

A basic idea of the invention can be seen in the fact that it proposes an anisotropic, that is to say, direction-dependent, friction between the expansion element and the slanted surface. Depending on the direction in which the slanted surface is moving relative to the expansion element, different frictional forces exist between the slanted surface and the expansion element under otherwise identical conditions.

The invention has found that the design of expansion anchors involves the situation in which a change in the configuration of the anchor can lead to an improvement of the anchoring behavior in one place, but it can also be associated with drawbacks in another place. Thus, for instance, it can be desirable, on the one hand, to provide a high coefficient of friction between the slanted surface and the expansion element in order to prevent the slanted surface from being pulled through the expansion element, that is to say, especially through the expansion sleeve, which would lead to a premature failure of the anchor in the case of excessive static tensile loads. On the other hand, a high coefficient of friction can increase the likelihood that the anchor will not grip at the beginning of the installation procedure and will then be pulled out of the drilled hole without expanding, which is undesirable. Moreover, an excessively high coefficient of friction can be disadvantageous when it comes to dynamic cracks in cracked concrete. After all, if the coefficient of friction between the slanted surface and the expansion sleeve is high, it is true that the slanted surface will be pulled deeper into the expansion sleeve when the crack in which the anchor is located widens. However, if the coefficient of friction is high, this process is not reversed when the crack subsequently closes again, and the slanted surface remains deep in the expansion sleeve, which can cause damage to the surrounding concrete. Therefore, in the case of cracked concrete, a low coefficient of friction can be advantageous in order to ensure "pumping", in other words, a back-and-forth sliding movement of the slanted surface in the expansion sleeve in response to the opening and subsequent closing of the crack.

Therefore, when a conventional anchor is being designed, it is necessary to decide whether a low coefficient of friction between the expansion element and the slanted surface should be selected with an eye towards achieving good properties in cracked concrete with moving cracks, although this is associated with a lower static pull-out load, or whether a high coefficient of friction should be selected which would then lead to high static pull-out loads but worse properties in cracked concrete.

This is where the invention comes in by proposing a direction-dependent coefficient of friction between the expansion element and the slanted surface. As a result, thanks to the invention, an additional degree of freedom is provided with which the expansion process of the expansion element can be controlled. In particular, the above-mentioned compromise between good properties in cracked concrete and high static pull-out loads can be remedied. In this manner, a particularly reliable and versatile anchor can be provided in a very simple manner.

The direction-dependent coefficient of friction can be achieved, for instance, by an asymmetrical structuring of the slanted surface and/or of the corresponding inner surface of the expansion element. The structuring can be created, for example, by means of a laser or electron beam treatment. As set forth in the invention, the term "coefficient of friction" refers especially to the static coefficient of friction. The expansion element and/or the stud is/are preferably made of a metal that can also be coated for purposes of influencing the friction in a targeted manner.

According to the invention, the expansion element is arranged on the stud so that it can be moved along it lengthwise. Whenever the terms "radial" and "axial" are employed here, these refer especially to the longitudinal axis of the stud and/or of the expansion anchor, which can especially be the axis of symmetry or the center axis of the stud or of the expansion anchor. In particular, the expansion anchor can be a force-controlled expanding expansion anchor.

According to the invention, the expansion element is pushed radially outwards by the slanted surface, as a result of which it presses against the wall of the hole drilled in the substrate when the stud is moved axially together with the slanted surface in the pull-out direction of the stud relative to the expansion element. This anchors the expansion anchor in the drilled hole. Preferably, the pull-out direction runs parallel to the longitudinal axis of the stud and/or it faces out of the drilled hole. Preferably, the distance from the longitudinal axis of the stud increases on the slanted surface counter to the pull-out direction.

In particular, it can be provided that the coefficient of friction is higher if the slanted surface is moved in the pull-out direction relative to the expansion element than it is if the slanted surface is moved counter to the pull-out direction relative to the expansion element, in other words, if moved in the direction of the bed of the drilled hole. In this manner, under otherwise identical conditions, the coefficient of friction is higher when the expansion element is pushed radially outwards along the slanted surface than when it slides back along the slanted surface radially inwards. As already elaborated upon above, this configuration translates into good properties in cracked concrete and it yields high static pull-out loads.

It is particularly advantageous that the coefficient of friction is 1.3 to 1.7 times, especially 1.5 times, higher if the slanted surface is moved in the pull-out direction relative to the expansion element than it is if the slanted surface is moved counter to the pull-out direction relative to the expansion element. As a result, a very reliable anchor with the usual dimensions can be obtained that exhibits good properties in cracked concrete with dynamic cracks as well as high static pull-out loads in concrete that is not cracked.

In a preferred embodiment of the invention, if the slanted surface is moved counter to the pull-out direction of the stud relative to the expansion element, the coefficient of friction is lower than the tangent of the angle that is included by the slanted surface with the longitudinal axis of the stud:

$$\mu < \tan(\alpha).$$

In this embodiment, the force component that is parallel to the slanted surface and that is established when a pressure directed towards the stud is exerted on the expansion element can be higher than the static friction between the expansion element and the slanted surface. As a result, in turn, it can be very reliably ensured that the friction cannot prevent the slanted surface from sliding back along the expansion element when a crack that had previously opened up in the surrounding concrete closes again. Consequently, the slanted surface is pressed once again deeper into the drilled hole, so that damage to the concrete in the expansion area of the stud is prevented.

According to the invention, the stud can have a load-absorbing means, which can especially be configured as an external thread or as an internal thread. The load-absorbing means is such that the tensile forces that are oriented in the pull-out direction can be introduced into the anchor. Advantageously, the slanted surface is arranged in a first end area of the stud while the load-absorbing means is arranged in second end area of the stud opposite from the first end area. In particular, the directional vector of the pull-out direction can be oriented from the slanted surface towards the load-absorbing means. On the slanted surface, the distance from the longitudinal axis of the stud increases as the distance from the load-absorbing means increases.

Especially preferably, the expansion element is an expansion sleeve that surrounds the stud at least in certain areas, and/or an expansion cone is arranged on the stud, whereby the slanted surface is formed by the expansion cone. This translates into a particularly uniform introduction of force in the circumferential direction. Preferably, the angular extension of the expansion sleeve around the longitudinal axis of the stud amounts to at least 270°, especially at least 315° or 340°. According to this embodiment, it is particularly simple to ensure that the stud does not rub directly against the wall of the drilled hole, but rather, at least for the most part, only indirectly via the expansion sleeve. This, in turn, very easily ensures that the friction that, according to the invention, is direction-dependent, is not masked by direct friction components between the stud and the wall of the drilled hole. According to the invention, the expansion cone is provided to spread open the expansion sleeve, that is to say, to radially widen the expansion sleeve. One or more expansion elements can be provided, along with a corresponding number of slanted surfaces. The expansion cone can have a mathematically strictly conical surface, but it does not necessarily have to.

With a so-called stud anchor, the expansion cone can be permanently attached axially to the stud. In this case, when the expansion anchor is being installed, the expansion cone is pulled into the expansion sleeve along with the slanted surface due to a joint axial movement of the stud and of the expansion cone relative to the expansion sleeve. Here, the expansion cone is preferably configured in one piece with the stud. As an alternative, in the case of a so-called sleeve anchor, the expansion cone can be a part that is separate from the stud and it can preferably be connected to the stud by means of matching threads. The expansion cone is pulled into the expansion sleeve, preferably at least partially, by a rotation of the stud relative to the expansion cone, and this rotation is then converted into an axial movement of the expansion cone relative to the stud by means of a spindle drive formed by the matching threads.

In particular, the stud can have a stop, for instance, an annular shoulder, that limits movement of the expansion element away from the slanted surface. This is especially advantageous in the case of a stud anchor. However, the expansion element, which can also be configured so as to consist of multiple parts, can also extend all the way to the opening of the drilled hole, especially in the case of a sleeve anchor.

BRIEF DESCRIPTION OF THE DRAWINGS

The invention will be explained in greater detail below on the basis of preferred embodiments that are schematically shown in the accompanying figures, whereby individual features of the embodiments shown below can be implemented within the scope of the invention, either on their own or in any desired combination. The following is shown schematically in the figures.

DETAILED DESCRIPTION

Figure 1:
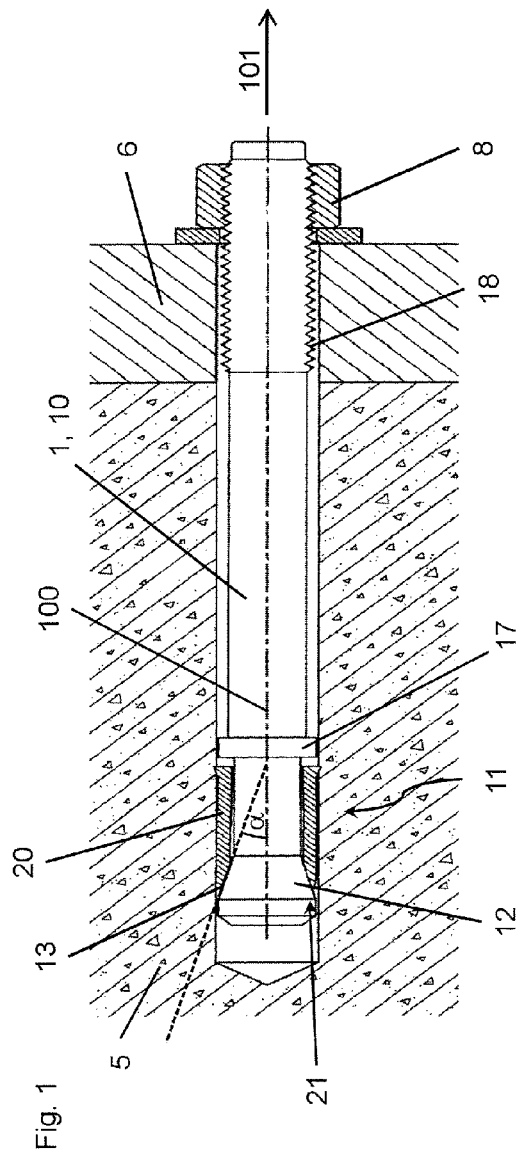
FIG. 1 a partial longitudinal sectional view of an expansion anchor according to the invention that has been installed in a concrete substrate, in accordance with a first embodiment.
Figure 2:
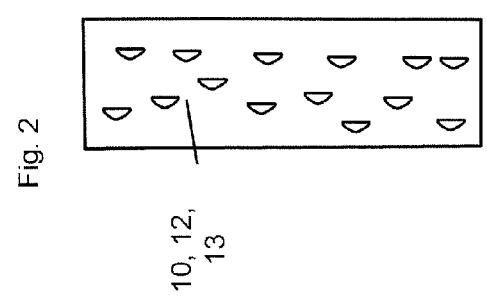
FIG. 2 a developed view of the outside of the stud of the anchor shown in FIG. 1 at the expansion cone.
Figure 3:
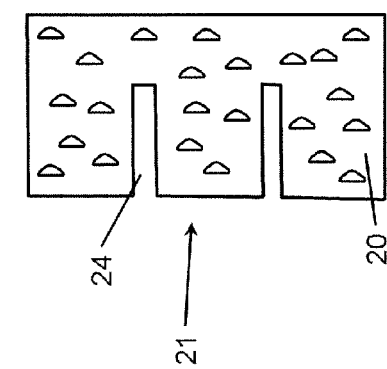
FIG. 3 a developed view of the inside of the expansion element—configured as an expansion sleeve—of the anchor shown in FIG. 1.

FIGS. 1 to 3 show an embodiment of an expansion anchor 1 according to the invention. As can especially be seen in FIG. 1, the expansion anchor 1 has a stud 10 and an expansion element 20, which is configured as an expansion sleeve, whereby the expansion sleeve surrounds the stud 10. The stud 10 has a neck section 11 with a constant cross section and, adjoining the neck section 11, in the area of the front end of the stud 10, it has an expansion cone 12 for the expansion sleeve 20 on which the surface is formed as a slanted surface 13. The slanted surface 13 is configured here so as to be rotation-symmetrical. Owing to the slanted surface 13, starting at the neck section 11, the stud 10 on the expansion cone 12 widens towards its front end. On the side of the neck section 11 facing away from the expansion cone 12, the stud 10 has a stop 17—configured, for instance, as an annular shoulder—for the expansion sleeve 20. At its rear end area opposite from the expansion cone 12, the stud 10 is provided with an external thread 18 for a nut 8.

As can especially be seen in FIG. 3, the expansion sleeve 20 has expansion slits 24 that project from the front face 21 of the expansion sleeve 20. These expansion slits 24 serve to facilitate the radial widening of the expansion sleeve 20 by the expansion cone 12 of the stud 10. The expansion sleeve 20 can be made by rolling up a sheet metal blank.

When the expansion anchor 1 is installed, the stud 10, with the expansion cone 12 facing forward, is pushed counter to the pull-out direction 101 parallel to the longitudinal axis 100 of the stud 10 into a hole drilled in the substrate 5 shown in FIG. 1. In this process, owing to the stop 17, the expansion element 20, which is configured as an expansion sleeve, is also inserted into the drilled hole. Then, for instance, through the tightening of the nut 8, the stud 10 is once again pulled somewhat out of the drilled hole in the pull-out direction 101 that runs parallel to the longitudinal axis 100. Owing to its friction against the wall of the drilled hole, the expansion element 20, which is configured as an expansion sleeve, is left behind, as a result of which the stud 10 moves relative to the expansion element 20. During this movement, the slanted surface 13 of the expansion cone 12 of the stud 10 penetrates ever-deeper into the expansion element 20 in such a way that the expansion element 20 is radially widened by the slanted surface 13 and pressed against the wall of the drilled hole. Owing to this mechanism, the expansion anchor 1 is affixed in the substrate 5. The installed state of the expansion anchor 1, in which it is affixed in the substrate 5, is shown in FIG. 1. The nut 8 can be used to secure an add-on part 6 to the substrate 5.

According to the invention, the static coefficient of friction $\mu$ between the expansion element 20 and the slanted surface 13 on the expansion cone 12 of the stud 10 is direction-dependent. In particular, if the stud 10 is moved in the pull-out direction 101 relative to the expansion element 20, the static coefficient of friction $\mu$ is greater than in the case of movement counter to the pull-out direction 101. Owing to the relatively high static coefficient of friction $\mu$ during movement of the stud 10 in the pull-out direction 101, high pull-out loads are achieved when under a static load, especially in concrete that is not cracked. Due to the relatively low static coefficient of friction $\mu$ during movement of the stud 10 counter to the pull-out direction 101, it can be ensured that the stud 10 will return to its original position relative to the expansion element 20 when a concrete crack opens up slightly at the anchor 1 and then closes again. This can especially be ensured if the static coefficient of friction $\mu$ that is established when the stud 10 is moved counter to the pull-out direction 101 is lower than the tangent of the angle $\alpha$ that is included by the slanted surface 13 with the longitudinal axis 100 of the stud:

$\mu < \tan(\alpha)$.

As is depicted in FIGS. 2 and 3, the expansion element 20 can have microstructuring, especially asymmetrical microstructuring, on its inner surface facing the stud 10, and/or on its circumferential surface facing the expansion element 20, and this microstructuring brings about the direction-dependence of the static coefficient of friction $\mu$ between the expansion element 20 and the slanted surface 13.

Figure 4:
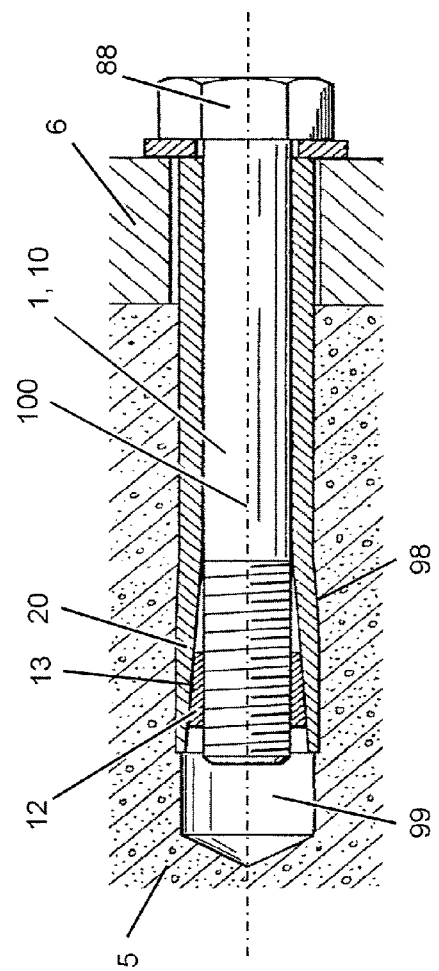
FIG. 4 a partial longitudinal sectional view of an expansion anchor according to the invention that has been installed in a concrete substrate, in accordance with a second embodiment.

In the embodiment of FIG. 1, the expansion anchor 1 is configured as a so-called stud anchor. Another embodiment, in which the expansion 1 is configured as a so-called sleeve anchor, is shown in FIG. 4. In contrast to the stud anchor shown in FIG. 1, in which the expansion cone 12 is permanently attached axially to the stud 10 together with the slanted surface 13 and is especially configured in one piece with the stud 10, the expansion cone 12, with the slanted surface 13, is a part that is separate from the stud 10 in the sleeve anchor of FIG. 4. It has an internal thread that matches an external thread on the stud 10. Moreover, in the case of the sleeve anchor shown in FIG. 4, the expansion element 20, which is configured as an expansion sleeve and which can also have a multi-part design, extends all the way to the opening of the drilled hole, and a widened head 88 is non-rotatably arranged at the rear end of the stud 10.

In order to install the sleeve anchor shown in FIG. 4, the stud 10 is made to rotate around the longitudinal axis 100 by means of the head 88. The matching threads convert this rotational movement of the stud 10 into an axial movement of the expansion cone 12 relative to the stud 10 and thus relative to the expansion sleeve 20, which causes the expansion cone 12, together with slanted surface 13, to be pulled into the expansion sleeve 20.

Also in the case of the sleeve anchor shown in FIG. 4, there is a coefficient of friction that, according to the invention, is direction-dependent between the expansion element 20, which is configured as an expansion sleeve, and the slanted surface 13, whereby the static coefficient of friction u can be selected as has been elaborated upon above in conjunction with the first embodiment.

What is claimed is:

1. An expansion anchor comprising:
   a stud;
   at least one expansion element; and
   at least one slanted surface arranged on the stud, the slanted surface pushing the expansion element radially outwards when the stud is moved in a pull-out direction relative to the expansion element;
   a coefficient of friction between the expansion element and the slanted surface being dependent on a direction of movement, wherein
   the coefficient of friction is higher if the slanted surface is moved in the pull-out direction relative to the expansion element than if the slanted surface is moved counter to the pull-out direction relative to the expansion element.

2. The expansion anchor as recited in claim 1 wherein the coefficient of friction is 1.3 to 1.7 times higher if the slanted surface is moved in the pull-out direction relative to the expansion element than if the slanted surface is moved counter to the pull-out direction relative to the expansion element.

3. The expansion anchor as recited in claim 2 wherein the coefficient of friction is 1.5 times higher if the slanted surface is moved in the pull-out direction relative to the expansion element than if the slanted surface is moved counter to the pull-out direction relative to the expansion element.

4. The expansion anchor as recited in claim 1 wherein the expansion element is an expansion sleeve surrounding the stud at least in certain areas, and in that an expansion cone is arranged on the stud, the slanted surface being formed by the expansion cone.

5. An expansion anchor comprising:
   a stud;
   at least one expansion element; and
   at least one slanted surface arranged on the stud, the slanted surface pushing the expansion element radially outwards when the stud is moved in a pull-out direction relative to the expansion element;

a coefficient of friction between the expansion element and the slanted surface being dependent on a direction of movement,
wherein if the slanted surface is moved counter to the pull-out direction relative to the expansion element, the coefficient of friction is lower than the tangent of an angle included by the slanted surface with a longitudinal axis of the stud.

* * * * *